United States Patent [19]
O'Meara

[11] 3,979,585
[45] Sept. 7, 1976

[54] ADAPTIVE IMAGING TELESCOPE WITH CAMERA-COMPUTER TRANSFORM IMAGE QUALITY SENSING AND ELECTRO-OPTIC PHASE SHIFTING

[75] Inventor: Thomas R. O'Meara, Malibu, Calif.

[73] Assignee: Hughes Aircraft Company, Culver City, Calif.

[22] Filed: June 24, 1974

[21] Appl. No.: 482,175

[52] U.S. Cl. .............................. 250/201; 350/160 R
[51] Int. Cl.² .......................................... G01J 1/20
[58] Field of Search ........... 250/201, 202, 203, 570; 350/160 R, 162 R, 162 SF, 17, 205; 178/DIG. 25; 331/94.5

[56] References Cited
UNITED STATES PATENTS

| | | | |
|---|---|---|---|
| 3,594,660 | 7/1971 | Huggett | 331/94.5 |
| 3,705,758 | 12/1972 | Haskal | 350/160 R |
| 3,711,786 | 1/1973 | Vautier et al. | 350/160 R |
| 3,713,042 | 1/1973 | Kinsel | 331/94.5 |
| 3,731,103 | 5/1973 | O'Meara | 250/199 |
| 3,788,749 | 1/1974 | George | 350/162 SF |
| 3,790,901 | 2/1974 | White et al. | 350/160 R |
| 3,846,628 | 11/1974 | Towne | 250/201 |

*Primary Examiner*—David C. Nelms
*Attorney, Agent, or Firm*—Martin E. Gerry; W. H. MacAllister

[57] ABSTRACT

An adaptive imaging telescope having a linear sensor for detecting a received optical image. The system includes a choice of two electro-optic phase shifters positioned substantially at the aperture of the telescope responsive to the received optical image. A non-coherent image quality sensor is provided consisting of a video camera and digital computation networks. This system also includes circuits responsive to outputs from the sensor feeding the phase shifter in a closed-loop arrangement.

7 Claims, 9 Drawing Figures

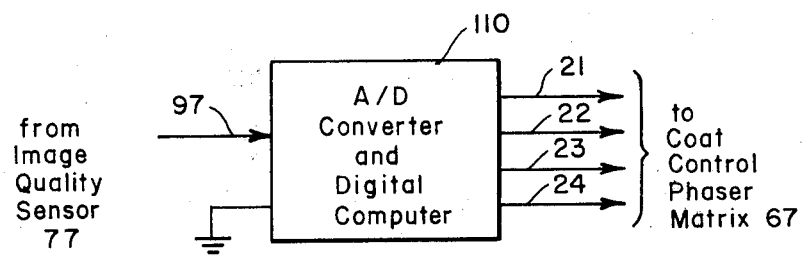
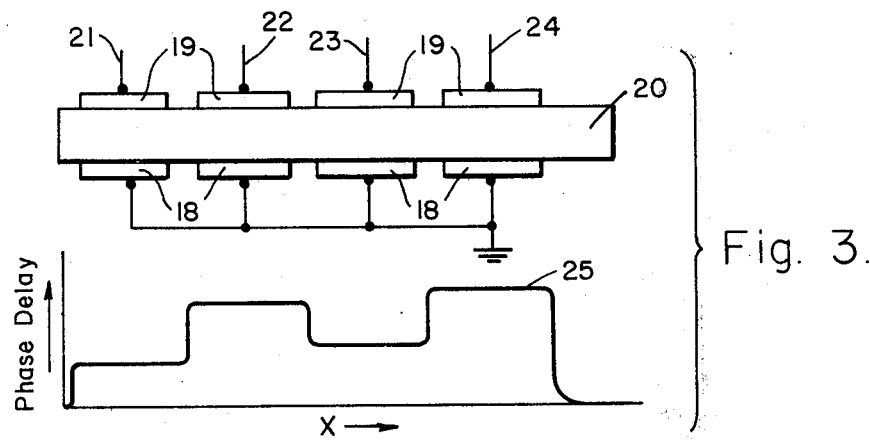
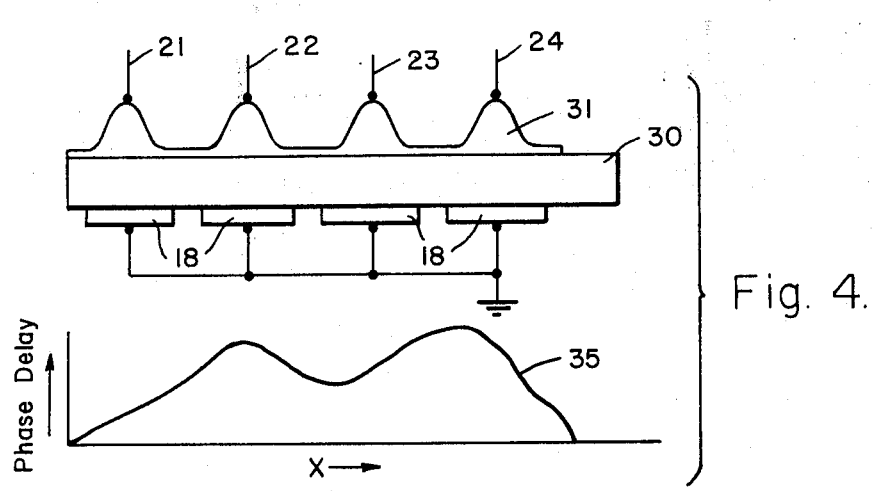

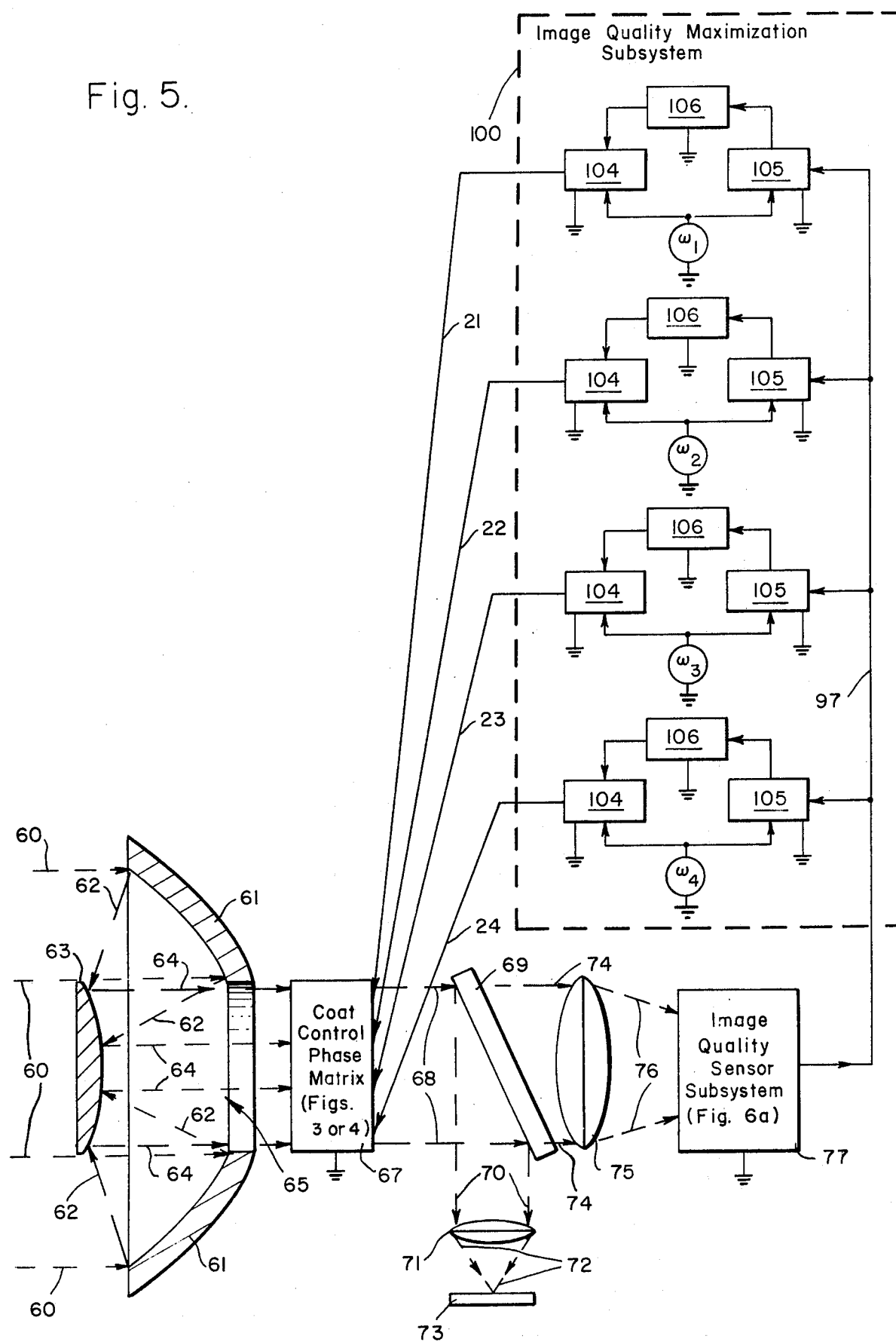

ADAPTIVE IMAGING TELESCOPE WITH CAMERA-COMPUTER TRANSFORM IMAGE QUALITY SENSING AND ELECTRO-OPTIC PHASE SHIFTING

CROSS-REFERENCE TO RELATED COPENDING APPLICATIONS

Applications, Ser. Nos. 482,186; 482,185; 482,187; and 482,188 were all filed June 24, 1974, concurrent with this application.

BACKGROUND OF THE INVENTION

This invention is in the field of adaptive imaging telescopes, and in particular such telescopes that compensate for atmospheric turbulence of viewed images.

The atmosphere has a substantial effect on a portion of a wavefront impinging on a small aperture, say four inches or less in diameter, at visible wavelengths. The impinged wavefronts can be decomposed into phase effects, and amplitude or scintillation effects. The phase effects are of major importance causing nearly a spatially uniform but time-varying random advance or retardation of the wavefront which can easily be as large as several times $2\pi$ radians.

In large telescopes which may be considered as compounded telescopes due to superposition of the above small apertures, the first effect mentioned is overwhelmingly troublesome. More specifically, with a point image, the subapertures may be paired, and it may be shown that each pair of subapertures generates its own characteristic Fourier component fringe pattern in the image plane. In the distortionless propagation case, all of these fringe patterns add constructively at the image center and effectively add more and more destructively at positions in the image plane progressively removed from the center. Since the first mentioned effect can change either the position of the fringes or the phase of the optical carrier, which is spatially modulated by them, it can readily happen that the desired constructive interference on axis, and destructive interference off axis, is not obtained. Consequently, peak image intensity is reduced and the image is not narrowed by the superposition of fringe patterns, or at least it is not narrowed to the full potential of the system. Thus, images are smeared out by these atmospheric effects and imaging through long atmospheric paths with apertures exceeding four inches is usually limited by this phenomenon rather than by the optics of the imaging system.

Prior art systems have employed several restoration schemes. Some classificational schemes are post-film-recording or restoration systems, and pre-film-recording or pre-correction systems. By far, the largest number of schemes have been of the post-film-recording category and, as one consequence, have not been real-time systems. Of the pre-film-recording techniques, holographic methods have been the most widely explored, and again these have not been in real time. Many suggested techniques, including holography have required a reference, that is a known, ideally a small source, to one side of the unknown source object. In most practical cases an ideal reference natural source is simply not available.

SUMMARY OF THE INVENTION

It is, therefore, an object of the instant invention to reduce the image smearing results by introducing corrective phase control across the receiving aperture which effectively restores the desired fringe superposition, and hence the clarity of the resultant image.

Another object of the instant invention is to eliminate the need for an adjacent reference source, nor a priori, make assumptions that symmetrical source distributions exist in the assumed source.

A further object is to provide a real-time operative system. That is, image corrections in the instant system must be accomplished within $10^{-2}$ seconds, since the atmosphere may substantially change in a period not much greater than this time period.

A still further object is to provide a system fully compatible with post-film-recording restoration techniques, which when combined with the instant invention extend thereto an additional benefit.

It is a yet further object to provide a system having some drift freedom without any particular lock-point in the image plane.

Accordingly, the instant invention employs electro-optic phase shifters to introduce equal and opposite (time-varying) phase shifts across each subaperture in such a way as to compensate the atmospheric shifts. For example, in astronomical imaging the image is to be made as bright and sharp as possible. To achieve this purpose, we need a single measure of the image contrast or sharpness and also we require a technique for maximizing it with respect to the control variables, such as the phase delay applied to the waves as received at each subaperture.

The measure of contrast to be employed is the relative high-to-low spatial frequency content in the image of an object which contains an intensity or reflectivity distribution which is a sinusoidal function of dimensional extent. Without distortion from atmospheric turbulence or the like, this spatial frequency distribution is retained in the image. Whereas with it the spatial modulation in the image is effectively reduced to nearly zero. The operation of the phase or path length correction system in the present invention is to substantially restore the high frequency spatial modulation content in the image. The transform of the constant background provides a low frequency reference term.

In general it will be recognized that the loss in spatial modulation will be a function of the spatial modulation frequency itself and that further there is some loss from the aperture limitation of the telescope itself even without propagation distortions. It will be noted that the higher spatial frequencies which contain the essence of the image detail are virtually eliminated by the atmospheric distortion while the lower spatial frequencies are but little affected. Accordingly, the ratio of high to low spatial frequency content is an appropriate measure of image quality. Further it is a measure which is independent of the absolute brightness of the source.

The detected outputs from the image quality sensor then provides error signals for driving the optical phase shifters in such a way that the image quality is maximized. More particularly, in order to achieve this maximization, these phase controls may be dithered at distinctive sinusoidal rates, with separate synchronous detection of each of the induced amplitude components in the image quality sensor output.

BRIEF DESCRIPTION OF THE DRAWINGS

FIG. 3 is an elevation view of an electro-optical phase shifter and its corresponding response curve of phase delay as a function of discrete step phase variation.

FIG. 4 is an elevation view of a continuous surface electro-optical phase shifter and its corresponding response curve of phase delay usable in lieu of the phase shifter of FIG. 3 and providing smooth phase variation with respect to distance.

FIG. 5 is an optical-electrical system schematic of the adaptive imaging telescope illustrating the combination of error sensing means and wavefront error correcting means, in accordance with this invention.

FIG. 7 shows alternate digital computer usage in the instant system in lieu of analog circuitry used in FIG. 5 illustration.

DETAILED DESCRIPTION

Figure 1:
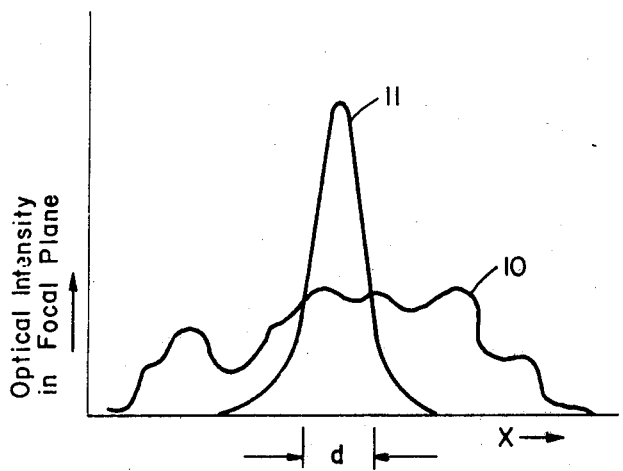
FIG. 1 is a response curve of the optical intensity distortion in the image plane showing an atmospherically distorted image and a compensated image in accordance with this invention.

Referring to FIG. 1 the object to be imaged is assumed to be an isolated glint or highlight in a reflectivity distribution, wherein the optical intensity as a function of distance X, in the focal plane of such distribution is shown at 10, resulting from an atmospherically distorted image. On the other hand, optical distortion is compensated for by the instant system so as to provide an optical intensity response in the focal plane of such distribution along the X ordinate (and similarly along the Y ordinate, not shown), as represented by curve 11.

Figure 2A:
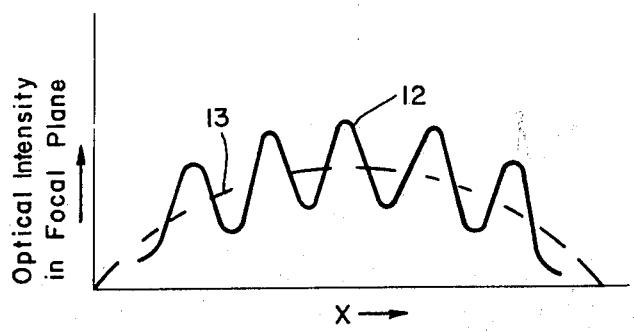
FIGS. 2a and 2b are response curves of the image intensity for an object with a single high spatial frequency in the image plane. These figures compare the corresponding optical intensity distribution in the optical transform means output showing that improved image quality results in an improved ratio of high to low spatial frequency content at a particular spatial frequency.
Figure 2B:
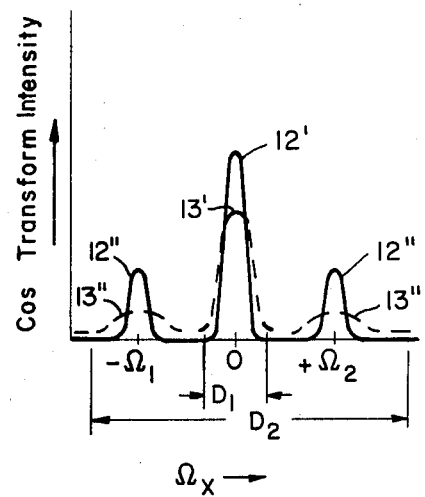

Referring to FIGS. 2a and 2b the object being imaged is assumed for purposes of illustration to be an extended source with a sinusoidal modulation of intensity across the source as at 12, as a function of distance X. Without distortion from atmospheric turbulence or the like, the spatial sinusoidal frequency distribution is retained in the image, whereas with distribution the spatial modulation is effectively reduced to nearly zero, as illustrated by curve 13. The operation of the phase or path length correction system in the present invention is directed so as to substantially restore the image to the undistorted curve 12. Whereas in FIG. 2a the optical intensity is shown as a function of one spatial ordinate X (spatial representation of ordinate Y being the same as X but not shown herein for simplicity), in FIG. 2b the optical intensity is in terms of a cosine transform as a function of spatial frequency $\Omega_x$ ($\Omega_y$ spatial frequency is not shown for simplicity but is similar to $\Omega_x$).

In general it will be recognized that the loss in spatial modulation will be a function of the spatial modulation frequency itself and that there is some loss from the aperture limitations inherent in the telescope even without propagation distortion (shown in FIG. 2c).

Figure 6A:
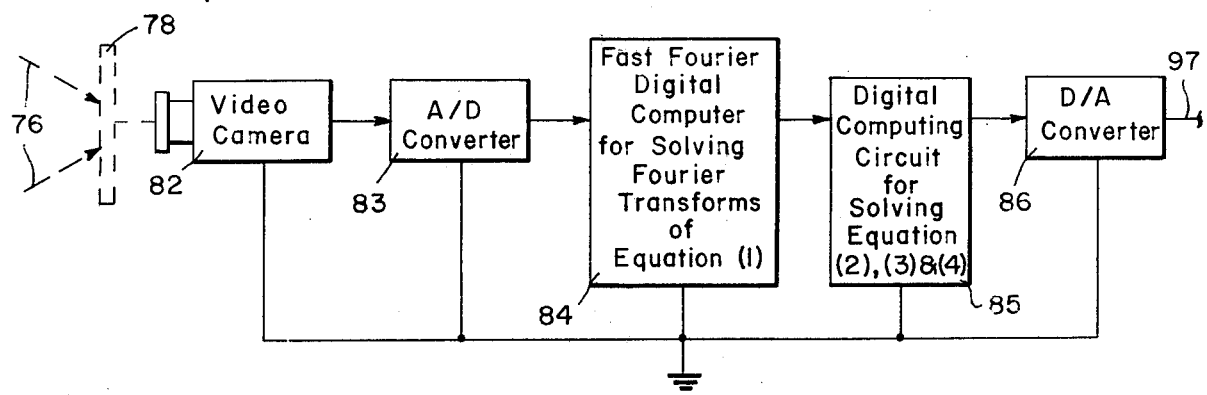
FIGS. 6a and 6b show the sensor unit that is used in the image quality sensor subsystem and the matrix of numbers in the complex plane resulting therefrom in accordance with this invention.
Figure 6B:
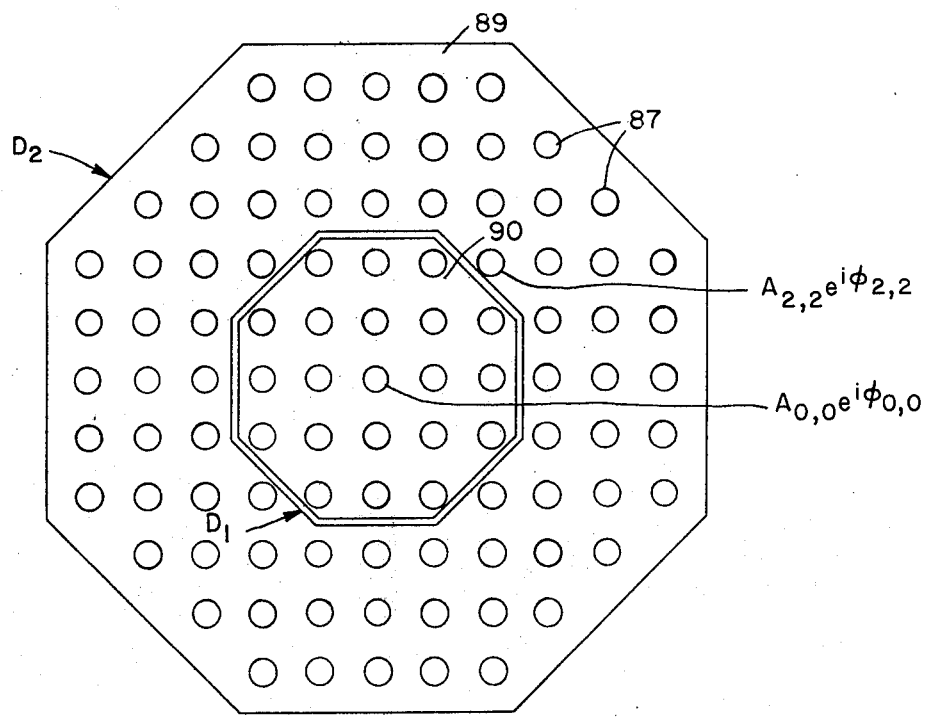

Referring to FIGS. 2b and 6b in particular, domain extent $D_1$ and $D_2$ are respectively the inner and outer domains. In FIG. 2b it can be seen that the amplitudes of a sinusoidal modulation function are converted by the Fourier transform or the Hadarmard transform to a pair of pronounced peaks at $+\Omega$, and $-\Omega$,. For example these peaks at 12 inches are substantially larger in amplitude than the transformed curve with atmospheric distortion as at 13 inches.

It will be noted that the higher spatial frequencies which contain the essence of the image detail are virtually eliminated by the atmospheric distortion while the lower spatial frequencies are but little affected. Accordingly the ratio of high to low spatial frequency content is an appropriate measure of image quality. Further it is a measure which is independent of the absolute brightness of the source.

Referring to FIGS. 3 and 4, it may be stated that although it has been convenient for discussion purposes to assume substantially rectangular step phase errors as a function of distance X and rectangular step phase correcting devices. In fact, it is to be expected that the phase errors are smoothly varying functions, and that it is more efficient in terms of correction quality to introduce corresponding phase error-correcting devices which present a more smoothly varying correction with space ordinate X than rectangular steps. Thus, for example, with an electro-optical (field dependent) phase shifter, one might employ electrode patches of relatively high conductivity coupled by areas of low conductivity such that the fields and hence the phase shifts vary smoothly from point to point.

Accordingly, FIG. 3 shows the structure comprising a crystal of the KDP type made of $KH_2PO_4$ at 20 with electrically conductive transparent electrodes 18 and 19 at the major surfaces of the crystal. Such electrodes are optically transparent, and the index of refraction of the crystal may be varied in known manner by applying different voltages of either AC or DC type to wires 21, 22, 23 and 24 and ground return, to result in phase delay as a function of discrete step variation as shown in curve 25.

FIG. 4, on the other hand, shows the same KDP type crystal at 30 with only a plurality of electrically conductive transparent electrodes 18 at one surface thereof and a special electrically conductive transparent electrode 31 of non-uniform surface height attached to crystal 30. The peaks of electrode 31 are attached to wires 21, 22, 23 and 24 to enable application of different voltages of either AC or DC between these wires and ground return so as to vary the applied field and hence the phase delay smoothly rather than discretely as in FIG. 3 and thereby obtain response curve as at 35.

The elements of matrix 67 may be those shown in FIG. 3 or in FIG. 4 as herein-above described.

Referring to FIG. 5, the function of the basic system is to sense a single measure of image quality sharpness and to maximize this measure with respect to each of the voltages applied to the phase correction matrices. As an aid to the maximization process, it is generally helpful for the central system to have the ability to introduce trial path length perturbations, explicitly shown below in connection with analog circuits used as at 100, or by use of digital computer 110 substituted for circuits 100.

Optical beam 60 enters the telescope to be reflected from reflectors 61 as beam 62. Beam 62 is impinged on reflector 63, reflector 63 directing the beam as at 64 through aperture 65 in telescopic reflector 61 to impinge on the elements of the phase shifters discussed in connection with FIGS. 3 or 4 above.

Optical beam as at 68 is propagated through the matrix elements of FIGS. 3 or 4 to impinge upon and be reflected from beam splitter 69 to be split as beam 70 and impinge on lens 71, and to exit lens 71 as beam 72 to impinge as a normal image upon a photographic plate or the like as at 73.

Sensor assembly 77 is comprised of the configuration shown in FIG. 6a with the matrix of numbers provided in the complex plane as illustrated by FIG. 6b.

Consequently referring to FIGS. 6a and 6b the image quality sensor, is shown in location 77 of FIG. 5. In this implementation the image of the received beam at 76 is shown at 78. The image at 78 provides optical input to sensing video camera 82. The electrical output of camera 82 is applied to a conventional electronic analog to digital converter circuit 83 and the output of circuit 83 is applied to an electronic digital computing circuit 84 for solving transforms of the Fourier type or other types. The outputs of circuit 84 are applied to another digital computer 85 and the output of computer 85 is provided as an input to a digital to analog converter 86 for providing output 97 therefrom to feed perturbation circuits 100.

A conventional digital computer as at 110 in FIG. 7 may be used as a substitute for circuits 100. When using computer 110 instead of subsystem 100, the configurations of FIG. 6a need not have the D/A converter 86, and computer 110 need not have the A/D converter, consequently output 97 from image quality sensor 77 will be the digital output of circuit 85.

Digital computing circuit 84 is commercially available as Model 1040 from Spectra Data Co., 18758 Bryant Street, Northridge, California, or as Models 306/HFFT or NOVA 800 computers made by Elsytec, 212 Michael Drive, Syosset, L.I., N.Y.

For a better understanding of the functioning of image quality sensor 77, specific reference is made to FIG. 6b and to the functions provided by the several components of the sensor.

The output of the two-dimensional fast Fourier transform processor 84 comprises a map of a series or matrix of numbers in the complex plane as at 87 (represented in digital form) defined on a matrix as FIG. 6b, as:

$$F(n,m) = A_{n,m} e^{i \phi_{n,m}} \qquad (1)$$

where $A_{n,m}$ is the modulus, and $e^{i \phi_{n,m}}$ is the complex argument.

An outer domain 89 and an inner domain 90 are also illustrated, superimposed on this matrix. In the dividing process two sets of numbers N and D are computed based on the magnitude of the complex numbers falling within these domains. These numbers are given as:

$$N = \sum_{\text{outer domain}} A_{n,m}^2 ; \text{ and} \qquad (2)$$

$$D = \sum_{\text{inner domain}} A_{n,m}^2. \qquad (3)$$

The dividing, an arithmetic operation, produces the ratio R, where $$R = N/D. \qquad (4)$$

Consequently, digital computing circuit 84 provides solutions of the particular complex numbers in terms of equation (1). The digital computing circuit provides the solution for N and D and ratio R as given in equations (2), (3) and (4). As pointed out above, any conventional digital computer as at 110 in FIG. 7, may be substituted for circuits 85 and 86.

Accordingly, error signals may be provided by the sensor at 97 so as to provide inputs to analog subsystem 100. Subsystem 100 will compute the error signal by synchronously detecting same with low frequency signals fed to perturbation circuits within subsystem 100.

The manner in which the image quality maximization or element perturbation subsystem 100 functions need not be discussed with particularity since such subsystem is discussed in detail in U.S Pat. No. 3,731,103. Briefly, subsystem 100 comprises four different electronic circuits, each circuit being fed by a different frequency, $\omega_1$, $\omega_2$, $\omega_3$ and $\omega_4$ respectively. Each said circuit is responsive to the appropriate frequency wherein said appropriate frequency output feeds an operational amplifier 104 and a synchronous detector 105. Output of detector 105 feeds a low pass filter 106. Generally the low pass band is chosen to give a closed loop response ranging between 100 and 1000 Hz. The output of filter 106 also feeds operational amplifier and summer 104. Each of the electronic circuits of subsystem 100 have outputs 21, 22, 23 and 24 from the four operational amplifiers which are provided as inputs to the elements of matrix 67, wherein either the discrete step phase shifter of FIG. 3 or the smooth phase shifter of FIG. 4 is actuated by signal outputs from perturbation circuit 100 at wires 21–24. Hence, outputs as at 21–24 will actuate either crystals 20 or 30 to phase modulate the optical signal (passing from telescope output through telescope aperture 65) in order to provide the corrective action and improved image quality.

Referring to FIG. 7, an alternative system utilizing a digital computer as at 110 may be substituted in FIG. 5 for subsystem 100. Inputs to computer 110 constitute the same outputs from image quality sensor 77, and the outputs from computer 110 constitute inputs 21–24 to control phase matrix 67.

In the foregoing schematics, the ground symbol was used to represent the return electrical path, in order to enable simple schematic representation showing single hard wire interconnections between the components of the system.

What is claimed is:

1. In an adaptive imaging telescope for detecting an optical image received by the telescope, comprising in combination:

an electro-optic phase shifter, including a planar crystal having two major surfaces and a plurality of electrodes attached to the major surfaces, which phase shifter is positioned substantially at the optical image plane of the telescope aperture, responsive to the optical image;

first means optically coupled to the phase shifter, comprising a video camera responsive to light from the optical image, an analog to digital converter electrically connected to the output of the video camera, a transform processor connected to the output of the converter, and digital computation means electrically connected to the output of the processor; and second means, electrically coupling the first means and phase shifter, for providing phase modulation of the optical image.

2. The invention as stated in claim 1, wherein said plurality of electrodes being a first plurality of electrodes attached to a first of the major surfaces and a second plurality of electrodes, attached to a second of the major surfaces opposite to the first major surface, for providing phase delay of the received optical image in discrete steps.

3. The invention as stated in claim 2, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and first means.

4. The invention as stated in claim 3, including:
another lens responsive to light reflected from the beam splitter; and
means for photographing the received image by virtue of the light communicated through said another lens.

5. The invention as stated in claim 1, wherein said plurality of electrodes being a multiple number of electrodes attached to a first of the major surfaces and an electrode of non-uniform surface height, attached to a second of the major surfaces opposite to the first major surface, for providing smoothly varying phase delay of the received optical image.

6. The invention as stated in claim 5, including:
an optical beam splitter; and
an optical beam focusing lens, said beam splitter being positioned in line with the optical image and angularly positioned with respect to the phase shifter and the focusing lens, said beam splitter and focusing lens being both positioned intermediate the phase shifter and first means.

7. The invention as stated in claim 6, including:
another lens responsive to light reflected from the beam splitter; and
means for photographing the received image by virtue of the light communicated through said another lens.

* * * * *

UNITED STATES PATENT OFFICE
CERTIFICATE OF CORRECTION

PATENT NO. : 3,979,585
DATED : September 7, 1976
INVENTOR(S) : THOMAS R. O'MEARA It is certified that error appears in the above-identified patent and that said Letters Patent are hereby corrected as shown below:

| COLUMN | LINE | DELETE | SUBSTITUTE |
|---|---|---|---|
| 4 | 3 | $-\Omega,.$ | $-\Omega.$ |
| 4 | 4 | 12 inches | 12" |
| 4 | 6 | 13 inches | 13" |
| 5 | 60 | equation (2) | $N = \sum_{\text{outer domain}} A_{n,m}^2$ ; and (2) |
| 5 | 62 | equation (3) | $N = \sum_{\text{inner domain}} A_{n,m}^2$ . (3) |
| 6 | 21 | $\omega 2$ | $\omega_2$ |

<u>Column 6, lines 52-54 should read:</u>

1. An adaptive imaging telescope for detecting an optical image received by the telescope comprising in combination:

Signed and Sealed this

Eighteenth Day of January 1977

[SEAL]

Attest:

RUTH C. MASON
*Attesting Officer*

C. MARSHALL DANN
*Commissioner of Patents and Trademarks*